United States Patent [19]

Pepper

[11] Patent Number: 5,361,533
[45] Date of Patent: Nov. 8, 1994

[54] DEVICE FOR INJECTING A PESTICIDE INTO CONCEALED AREAS WITHIN A STRUCTURE

[76] Inventor: Douglas D. Pepper, 5043 E. Fairmount Ave., Tucson, Ariz. 85712

[21] Appl. No.: 112,198

[22] Filed: Aug. 26, 1993

[51] Int. Cl.5 ............................................. A01M 7/00
[52] U.S. Cl. ...................................... 43/124; 43/132.1
[58] Field of Search ...................... 43/124, 131, 132.1, 43/900

[56] References Cited

U.S. PATENT DOCUMENTS

| | | | |
|---|---|---|---|
| 2,862,765 | 12/1958 | Wing | 43/124 |
| 4,648,202 | 3/1987 | Renth . | |
| 4,742,641 | 5/1988 | Cretti . | |
| 4,823,505 | 4/1989 | Jackson . | |
| 4,944,110 | 7/1990 | Sims . | |
| 4,945,673 | 8/1990 | Lavelle | 43/124 |
| 5,054,231 | 10/1991 | Witherspoon | 43/132.1 |
| 5,058,312 | 10/1991 | Jackson | 43/132.1 |
| 5,109,628 | 5/1992 | Ellefson | 43/124 |

FOREIGN PATENT DOCUMENTS 2643222  8/1990  France ................. 43/124

*Primary Examiner*—P. Austin Bradley
*Assistant Examiner*—Chuck Y. Mah
*Attorney, Agent, or Firm*—Larson & Taylor

[57] ABSTRACT

A device for injecting a pesticide from an exposed area to a concealed area behind a wall is disclosed. The device includes a plug which is permanently secured to an opening in the wall. A spray tube extends through the plug from the exposed area into the concealed area. A hose is removably connectable at one end to the spray tube from the exposed area. The hose is connectable at an opposite end to the outlet of a remote pesticide container, thus allowing a remote pesticide container to be used to spray pesticide into the concealed area.

13 Claims, 3 Drawing Sheets

DEVICE FOR INJECTING A PESTICIDE INTO CONCEALED AREAS WITHIN A STRUCTURE

FIELD OF THE INVENTION

The present invention relates to a device for eliminating bugs, rodents and other pests within a structure and, more particularly, to a device which may be permanently mounted in the structure for injecting various commercially packaged pesticides into concealed areas within the structure.

BACKGROUND OF THE INVENTION

Insects, rodents and other pests often inhabit homes and commercial buildings and multiply at an alarming rate. These pests not only impart visible destruction, but may also carry infectious diseases which are transmitted to humans either through direct contact or through the intermediary of contacted foodstuffs or utensils. Many commercially available pest control products are highly effective in reducing or eliminating pests. However, a major drawback of most commercially available products is that they are designed only to treat exposed areas, and are not designed to treat concealed areas such as voids in a structure where insects and rodents tend to live and multiply. Furthermore, these pesticides are typically packaged in an aerosol canister or bottle having a spray-type nozzle which does not lend itself to treating concealed areas within a structure. While professional extermination equipment may provide somewhat more effective means of dispensing pesticides to concealed areas, extermination services tend to be quite costly. Moreover, because the equipment is not designed to reach concealed areas, the pest population is often merely just controlled, rather than eliminated.

Others have previously attempted to overcome these drawbacks through various devices in which a pesticide is introduced into concealed areas, such as between walls. U.S. Pat. No. 4,823,505 discloses a fumigation system for exterminating insects in an existing building. The system includes a tunnel device which is permanently mounted in the wall and provides access to a cavity between the interior and exterior walls of a building. The tunnel device is inserted through an aperture in the wall of similar cross-section. One drawback of the system is that the tunnel device must have a surface which is adaptable to pressure seal the outer contour of a fumigant injection nozzle. Consequently, once installed, the system is only usable with specific types of packaging. Yet another drawback of this system is that the tunnel device requires a plurality of upstanding barbs to hold it in place which may cause substantial damage to the wall during installation.

Another device for injecting pesticide between walls is disclosed in U.S. Pat. No. 4,648,202, which relates to a method and apparatus for dispensing selected amounts of insecticide through a needle into building structure void spaces. The needle may be inserted through various forms of wall panel members. Pesticide is then released into the spaces by pneumatically forcing metered amounts of the pesticide through the needle. This apparatus also has several drawbacks. For example, the needle is unable to penetrate relatively hard surfaces, such as wood, and, consequently, cannot be used to inject pesticide behind a kitchen cabinet or wood paneling. In addition, the apparatus is suitable only for use with containers of pesticide having a screw-type cap and cannot be used with aerosol canisters.

Accordingly, the need exists to provide an improved system for applying pesticide in concealed areas within a home or commercial building which is relatively inexpensive, yet effectively eliminates insects, rodents and other pests.

SUMMARY OF THE INVENTION

Thus, it is a purpose of the present invention to overcome the disadvantages of the prior art and thereby provide a relatively inexpensive device for injecting a pesticide into concealed areas within a structure.

In accordance with a preferred embodiment of the invention, the device includes a spray tube having two open ends, the spray tube including a spray tip, being insertable through an aperture from a visible portion of a structure into a concealed area within the structure. An applicator hose has two open ends; a first end which is attachable to the inlet end of the spray tube and a second end which is attachable to a source of pesticide.

Preferably, the spray tip for introducing the pesticide into the concealed areas includes a lip portion spaced at a distance from the aperture from which the pesticide enters the concealed area for providing a directional spray therein. A cap may be attached to the second end of the applicator hose for attachment to an aerosol canister containing pesticide.

It is therefore an object of the present invention to provide a device for injecting pesticide into concealed areas within a structure which is easily installed in the structure and may be permanently mounted therein.

It is another object of the present invention to provide a device for applying pesticide in a structure such that exposure of harmful chemicals to humans is minimized.

It is yet another object of the present invention to provide a device for applying pesticide in a structure which may be utilized in conjunction with commercially available pesticide containers.

These and other objects of the present invention will become apparent from the detailed description to follow.

BRIEF DESCRIPTION OF THE DRAWINGS

There follows a detailed description of the preferred embodiments of the present invention which are to be taken together with the accompanying drawings, wherein.

DESCRIPTION OF THE PREFERRED EMBODIMENTS

Referring now to the figures, like elements are represented by like numerals throughout the several views.

Figure 1:
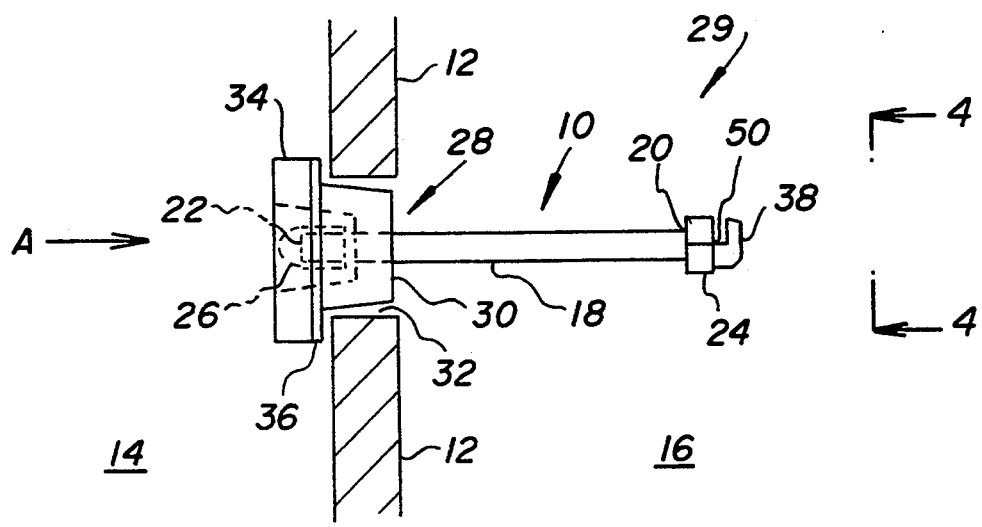
FIG. 1 is a highly schematic drawing of the device of the present invention installed in a structure prior to being coupled to a source of pesticide.

FIG. 1 shows the device 10 of the present invention installed in a structure 12. The structure 12 may be a wall, cabinet, or other essentially fixed structure which defines a concealed area 16. The structure 12 is visible from exposed area 14, which may be a room or interior of a cabinet. The device 10 includes of a spray tube 18 having two open ends, an outlet end 20 and an inlet end 22. A spray tip 24 is coupled to the outlet end 20 of the spray tube 18. During application of pesticide into a concealed area 16 in the direction of arrow A, a source of pesticide is attached via a tube to the inlet end 22 for injecting pesticide into the concealed area 16. At other times, a cap 26 is provided for sealing the inlet end 22 of the spray tube 18.

Figure 2:
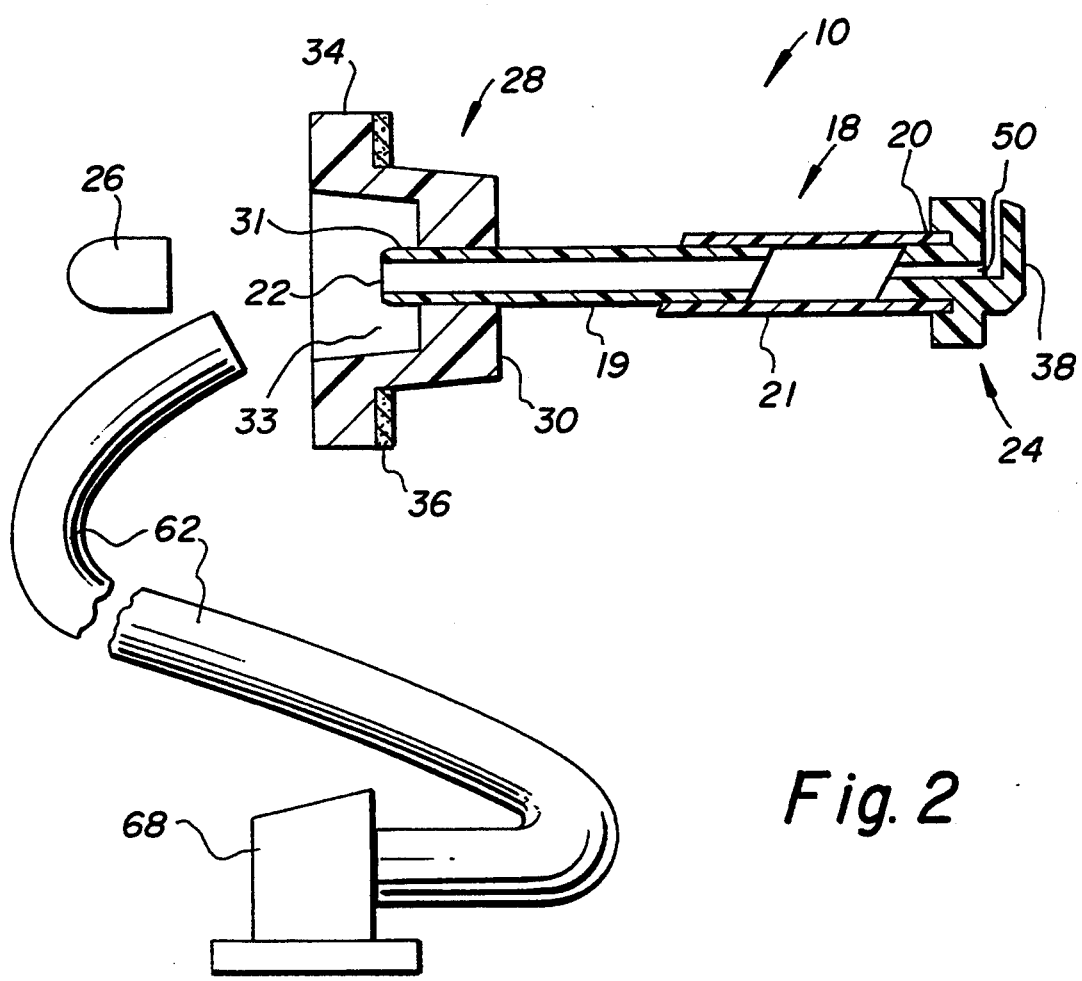
FIG. 2 is a central cross-sectional view of the device of the present invention, and showing also an end cap and hose, both usable therewith.

FIG. 2 shows a central cross-sectional view of the device, including wallplug 28, spray tube 18 and spray tip 24. FIG. 2 also shows a hose 62 having an end piece 68 and an end cap 26, both usable therewith. An interior portion 30 of the plug 28 is sized for insertion into an aperture 32 within the structure. An exterior portion 34 of the plug 28 remains visible in the exposed area 14 and is preferably of slightly larger dimension than the interior portion 30 in order to seal the aperature 32. It is, therefore, desirable to provide means for affixing the exterior portion 34 to the structure 12, such as a two-sided adhesive strip 36. The exterior portion 34 of the plug 28 also preferably includes a depression 33 in the central portion into which the spray tube 28 extends.

Preferably, the spray tube 18 is constructed in two pieces 19 and 21. Piece 19 is typically fixed to the plug 28 near the inlet end 22 of the spray tube 18. A portion 31 of piece 19 extends into the depression 33 so that end cap 26 may be easily mounted thereon. Piece 21 connects piece 19 to the spray tip 24. Piece 21 is removable and can be replaced with tubing of a longer or shorter length than piece 21. Thus, the length of spray tube 18 can be adjusted depending on the nature of the concealed area.

The end cap 26 and plug 28 prevent pesticide fumes already in the concealed area 16 from reaching the outside exposed area 14 and potentially contacting humans. Plug 28 also prevents pests from escaping through the aperature 32 after treatment of the concealed area 16.

Figure 3:
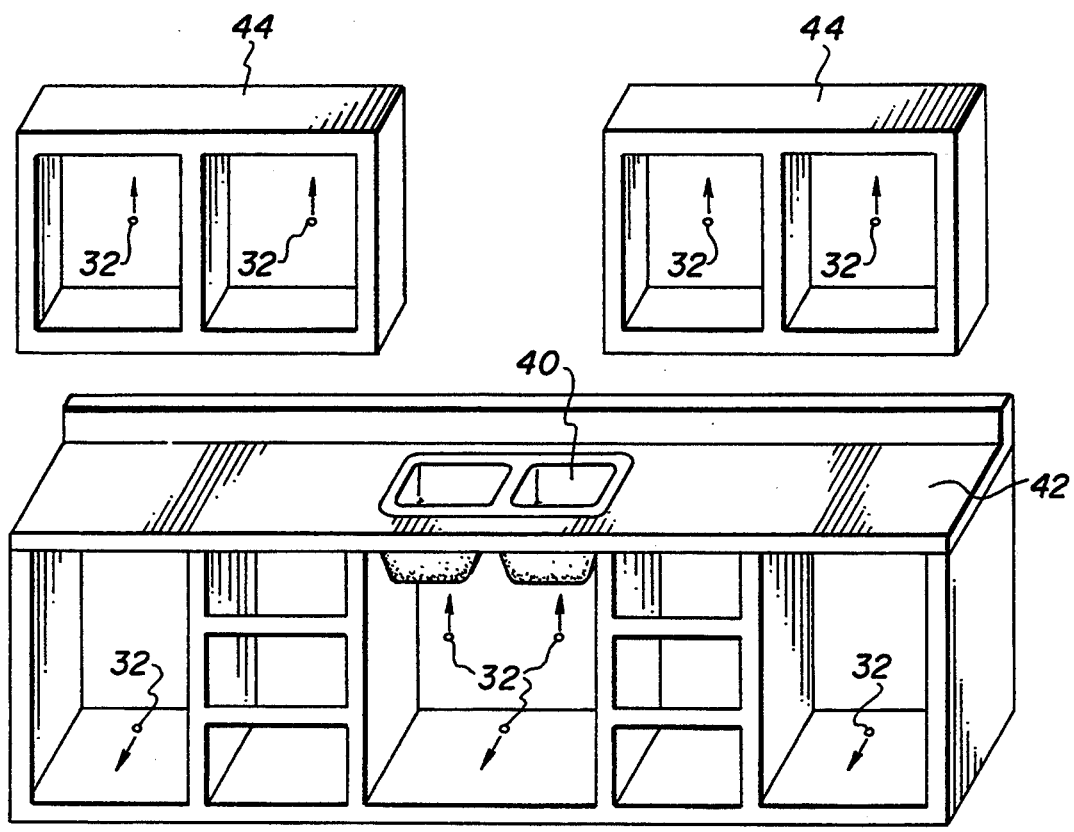
FIG. 3 shows typical installations of the present devices in a kitchen.

Typically, as shown in FIG. 3, one or more apertures 32 are formed in a wall, usually by drilling a substantially cylindrical hole in the structure 12. The plug 28 and aperature 32 may be of any suitable dimension. A ⅜ inch diameter hole, for example, is large enough to allow injection of pesticide, yet does not detract from the general appearance of the structure 12. In this regard, it is desirable that apertures be formed in locations that are not readily visible.

FIG. 3 shows appropriate locations for apertures 32 in a typical kitchen configuration. The apertures 32 are positioned beneath the sink 40 and countertop 42 and in central locations within cupboards 44, all of which are typically hidden from view by cabinet doors (not shown). This configuration enables injection of pesticide behind built-in structures within the kitchen where pests live and multiply.

Figure 4:
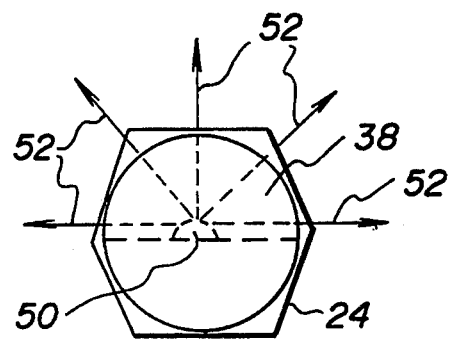
FIG. 4 is an enlarged end view of the spray tip through which pesticide is injected, taken in the direction of the line 4—4 of FIG. 1.

FIG. 4 shows an enlarged end view of the spray tip 24 in detail. Preferably, the spray tip 24 comprises a lip portion 38 spaced at a distance, on the order of 1/16 to ¼ inch, from the opening 50 through which pesticide is injected. Thus, when a stream of pesticide exits the spray tip 24 through narrowed opening 50, it impinges upon the lip portion 38 to create a directional spray. Consequently, the device 10 may be positioned in the structure 12 to provide a directional spray which provides the most advantageous coverage of a concealed area. The most advantageous spray directions for the configuration shown in FIG. 3 are indicated by arrows.

Figure 5:
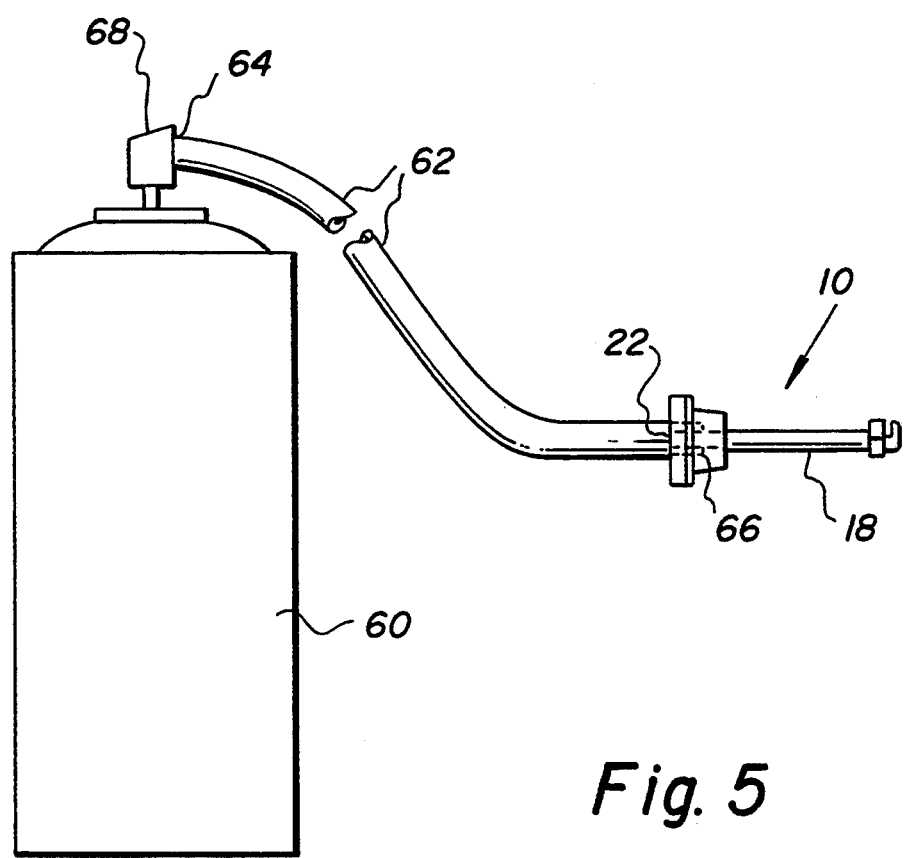
FIG. 5 shows the device of the present invention coupled to a commercially available pesticide container.

FIG. 5 shows the device 10 coupled to a source of pesticide 60. Generally, commercially available pesticides are available in aerosol-type canisters as shown or in bottles having a spray-type nozzle. The device 10 is coupled to the source of pesticide 60 by removing end cap 26 and attaching a first end 66 of an applicator hose 62 to the inlet end 22 of the spray tube 18. The device 10 preferably includes an end piece 68, attached to a second end 64 of the applicator hose 62, which is a button of the type normally located on the outlet tube of the aerosol can 60. The button which comes with the aerosol can would then be removed and replaced with end piece 68. Alternatively, the end piece 68 may be of the type adaptable for use with another type of remote pesticide container such as a spray-type bottle or other suitable pesticide container.

The device of the present invention is highly versatile since it may be used to treat concealed areas behind cabinets, walls or other such structures using commercially available pesticides. Once installed, pesticide may be applied to concealed areas regularly, periodically or at the first sign of insects or rodents, thereby reducing the chance that they will multiply to an uncontrollable level. Moreover, the device provides a safer means of applying pesticide since it reduces the chance of harmful contact with humans.

Although the invention has been described in considerable detail with respect to preferred embodiments thereof, variations and modifications will be apparent to those skilled in the art without departing from the spirit and scope of the invention as set forth in the claims.

I claim:

1. A device for injecting a pesticide comprising a liquid or an aerosol from an exposed area to a concealed area behind a wall, said device comprising:

a plug having means to be secured to an opening in the wall, a spray tube fixed to and extending through the plug from an inlet end in the exposed area to an outlet end in the concealed area when said plug is mounted in the wall, said plug and said spray tube being removable from the wall; and a hose means directly and removably connectable at a first end to said spray tube at said inlet end and connectable at a second end to the outlet of a remote pesticide container, whereby a remote pesticide container can be used to spray pesticide through the hose and plug to the concealed area.

2. The device according to claim 1, further comprising an end piece permanently fixed to the second end of said hose means for attachment to the remote pesticide container.

3. The device according to claim 1, further comprising an end cap for sealing the inlet end of the spray tube when a source of pesticide is not attached thereto.

4. The device according to claim 1, including a spray tip at the outlet end of the spray tube, said spray tip comprising an opening for introducing a pesticide into a concealed area within a structure in the form of a spray and a lip portion spaced at a distance from the opening for providing a directional spray.

5. The device according to claim 1, wherein the remote container is an aerosol canister containing pesticide.

6. The device according to claim 1 wherein the plug is affixed to the structure by means of a two-sided adhesive.

7. A pesticidal spray container in combination with spray means mounted in a wall for injecting a pesticide from an exposed area to a concealed area behind a wall, said combination comprising:

spray means comprising a plug secured to an opening in the wall and a spray tube fixed to and extending through the plug from an inlet end in the exposed area to an outlet end in the concealed area, said plug and said spray tube being removable from the wall;

a pesticidal spray container for containing a pesticide comprising a liquid or an aerosol therein; and hose means removably connectable at a first end to said spray tube at said inlet end and having an end piece permanently fixed to a second end thereof for attachment to said pesticidal spray container, whereby pesticide is introduced into said concealed area.

8. The pesticidal spray container in combination with spray means according to claim 7 wherein said spray container comprises an aerosol canister and said end piece comprises a spray cap used on an aerosol canister.

9. A device for injecting a pesticide comprising a liquid or an aerosol from an exposed area to a concealed area behind a wall, said device comprising:

a plug having means to be permanently secured to an opening in the wall, a spray tube fixed to and extending through the plug from an inlet end in the exposed area to an outlet end in the concealed area when said plug is mounted in the wall, said spray tube including a spray tip at the outlet end thereof, said spray tip comprising an opening for introducing a pesticide into a concealed area within a structure in the form of a spray and a lip portion spaced at a distance from the opening for providing a directional spray; and a hose means directly and removably connectable at a first end to said spray tube at said inlet end and connectable at a second end to the outlet of a remote pesticide container, whereby a remote pesticide container can be used to spray pesticide through the hose and plug to the concealed area.

10. The device according to claim 9, further comprising an end piece permanently fixed to the second end of said hose means for attachment to the remote pesticide container.

11. The device according to claim 9, further comprising an end cap for sealing the inlet end of the spray tube when a source of pesticide is not attached thereto.

12. The device according to claim 9, wherein the remote container is an aerosol canister containing pesticide.

13. The device according to claim 9, wherein the plug is affixed to the structure by means of a two-sided adhesive.

* * * * *